US008004960B2

(12) United States Patent
Raj

(10) Patent No.: US 8,004,960 B2
(45) Date of Patent: Aug. 23, 2011

(54) METHOD AND APPARATUS FOR FORWARDING LABEL DISTRIBUTION PROTOCOL MULTICAST TRAFFIC DURING FAST REROUTE

(75) Inventor: Alex E. Raj, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 642 days.

(21) Appl. No.: 11/413,252

(22) Filed: Apr. 28, 2006

(65) Prior Publication Data
US 2007/0253416 A1 Nov. 1, 2007

(51) Int. Cl.
*G01R 31/08* (2006.01)

(52) U.S. Cl. ........ 370/216; 370/408; 709/221; 709/239; 709/242; 709/252

(58) Field of Classification Search ........................ None
See application file for complete search history.

(56) References Cited

U.S. PATENT DOCUMENTS

| 6,374,303 | B1* | 4/2002 | Armitage et al. | 709/242 |
| 6,778,492 | B2 | 8/2004 | Charny et al. | |
| 6,801,506 | B1 | 10/2004 | Dey | |
| 6,879,594 | B1* | 4/2005 | Lee et al. | 370/408 |
| 6,978,394 | B1 | 12/2005 | Charny et al. | |
| 7,035,937 | B2* | 4/2006 | Haas et al. | 709/239 |
| 7,496,644 | B2* | 2/2009 | Shand et al. | 709/221 |
| 2003/0112749 | A1* | 6/2003 | Hassink et al. | 370/225 |
| 2003/0233595 | A1 | 12/2003 | Charny et al. | |
| 2004/0052207 | A1 | 3/2004 | Charny et al. | |
| 2005/0097219 | A1 | 5/2005 | Goguen et al. | |
| 2005/0111351 | A1* | 5/2005 | Shen | 370/217 |
| 2005/0265228 | A1* | 12/2005 | Fredette et al. | 370/216 |
| 2005/0281192 | A1 | 12/2005 | Nadeau et al. | |
| 2006/0031490 | A1 | 2/2006 | Provine et al. | |
| 2006/0159009 | A1* | 7/2006 | Kim et al. | 370/216 |
| 2007/0019646 | A1* | 1/2007 | Bryant et al. | 370/390 |
| 2007/0201355 | A1* | 8/2007 | Vasseur et al. | 370/217 |

OTHER PUBLICATIONS

U.S. Appl. No. 11/336,457, entitled Methods and Apparatus for Implementing Protection for Multicast Services, filed Jan. 20, 2006, by Raj et al.
U.S. Appl. No. 11/203,801, entitled Method and Apparatus Using Multiprotocol Label Switching (MPLS) Label Distribution Protocol (LDP) to Establish Label Switching Paths (LSPS) for Directed Forwarding, filed Aug. 15, 2005, by Raj et al.
Minei, I., et al., Network Working Group Internet Draft, entitled Label Distribution Protocol Extensions for Point-to-Multipoint and Multipoint-to-Multipoint Label Switched Paths (draft-ietf-mpls-ldp-p2mp-00), Feb. 26, 2006, pp. 1-19.
Rosen, E., et al., Network Working Group Request for Comments 3031, entitled Multiprotocol Label Switching Architecture, Jan. 2001, pp. 1-57.

* cited by examiner

*Primary Examiner* — Daniel J Ryman
*Assistant Examiner* — Brian Roberts
(74) *Attorney, Agent, or Firm* — Cesari and McKenna, LLP

(57) ABSTRACT

A computer apparatus comprising a processor and a forwarding engine arranged to forward LDP multicast traffic along a multicast tree having a primary and a backup path in a converged network topology, the processor being configured to cause the forwarding engine to forward traffic via the backup path upon a topology change and send a changed topology label and path vector to at least one neighbor node in the changed topology.

18 Claims, 15 Drawing Sheets

METHOD AND APPARATUS FOR FORWARDING LABEL DISTRIBUTION PROTOCOL MULTICAST TRAFFIC DURING FAST REROUTE

BACKGROUND OF THE INVENTION

1. Field of the Invention

The present invention generally relates to forwarding of multicast traffic. The invention relates more specifically to a method and apparatus for forwarding label distribution protocol multicast traffic along a multicast tree having a primary and a backup path.

2. Background Information

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

MPLS is a protocol that is well known to the skilled reader and which is described in document "Multi Protocol Label Switching Architecture" which is available at the time of writing on the file "rfc3031.txt" in the directory "rfc" of the domain "ietf.org" on the World Wide Web. According to MPLS, a path for a source-destination pair is established, and values required for forwarding a packet between adjacent routers in the path together with headers or "labels" are prepended to the packet. The labels are used to direct the packet to the correct interface and next hop. The labels precede the IP or other header allowing smaller outer headers.

The path for the source-destination pair, termed a Label Switched Path (LSP) can be established according to various different approaches. One such approach is Label Distribution Protocol (LDP) in which each router in the path sends its label to the neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to it. A Label Forwarding Information Base (LFIB) stores the FEC, the next-hop information for the LSP, and the label required by the next hop.

MPLS LDP approaches have flurther been applied to multicast networks. Conventionally multicast networks rely on unicast routing protocols. Unicast routing protocol relies on a routing algorithm resident at each node. Each node on the network advertises the routes throughout the network. The routes are stored in a routing information base (RIB) and based on these results a forwarding information base (FIB) or forwarding table is updated to control forwarding of packets appropriately. When there is a network change, a notification representing the change is flooded through the network by each node adjacent the change, each node receiving a notification sending it to each adjacent node.

As a result, when a data packet for a destination node arrives at a node the node identifies the optimum route to that destination and forwards the packet via the correct interface to the next node ("NEXT_HOP") along that route. The next node repeats this step and so forth.

Multicast networks such as point to multi point (P2MP) are built on Unicast routing protocols. However multicast allows data packets to be forwarded to multiple destinations (or "receivers") without unnecessary duplication, reducing the amount of data traffic accordingly. All hosts wishing to become a receiver for a multicast group perform a "join" operation to join the multicast group. A multicast tree such as a shortest path tree is then created providing routes to all receivers in the group. The multicast group in a P2MP group is denoted (S,G) where S is the address of the source or broadcasting host and G is an IP multicast address taken from a reserved address space. As a result routers receiving a packet from the source S to the multicast address G send the packet down each interface providing a next hop along the route to any receiver on the tree.

During forwarding of multicast data at a router, when a packet is received at the router with a multicast address as destination address, the router consults the multicast forwarding table and sends the packet to the correct next hop via the corresponding interface. As a result, even if the path from the next hop subsequently branches to multiple receivers, only a single multicast packet needs to be sent to the next hop. If, at the router, more than one next hop is required, that is to say the multicast tree branches at the router, then the packet is copied and sent on each relevant output interface.

However it is important to ensure that looping does not take place, for example where a router forwards multicast traffic which is then returned to it such that repeat forwarding takes place. Any such loops and any multicast network will propagate very quickly and can lead to network overload.

In order therefore to avoid looping each router ensures that data is only sent away from the source and towards the receiver. In order to achieve this the router carries out a reverse path forwarding (RPF) check to ensure that the incoming packet has arrived on the appropriate input interface. If the check fails then the packet is dropped. The router uses the unicast forwarding table to identify the appropriate upstream and downstream interfaces in the tree as part of the RPF and only forwards packets arriving from the upstream direction.

Multicast methods which make use of existing forwarding information in this manner belong to the family of "protocol independent multicast" (PIM) methods as they are independent of the specific routing protocol adopted at each router.

More recently the use of MPLS multicast has been explored and in particular the use of LDP has been discussed for building receiver driven multicast trees. Once such approach is described in Label Distribution Protocol Extensions for Point-to-Multipoint Label Switched Paths" of I. Minei et al which is available at the time of writing on the file "draft-ietf-mpls-ldp-p2mp-00.txt" in the directory "wg/mpls" of the domain "tools.ietf.org".

The approach described therein can be understood further with reference to FIG. 1 which is a network diagram illustrating a P2MP network and FIG. 2 which is a flow diagram illustrating the steps involved in a node joining the network. The network shown in FIG. 1 is designated generally 100 and includes nodes comprising, for example routers R1, reference 102, R2, reference numeral 104, R3, reference numeral 106 and R4, reference numeral 108. Node R1, R2 and R4 are joined to node R3 via respective interfaces S0, S1, S2, reference numerals 110, 112, 114 respectively. Nodes R1 and R2 comprise leaf or receiver nodes which can receive multicast traffic from root node R4 via transit node R3.

Referring to FIG. 2, at step 200, receiver node R2 joins the multicast tree according to any appropriate mechanism, and obtains the relevant identifiers of the tree, namely the root node and the FEC of traffic belonging to the tree. It then creates an LDP path from the root R4. In particular, at step 202 R2 identifies its nexthop to the root of the tree for example from its IP forwarding table, in the present case, node R3. At step 204 node R2 constructs a P2MP label mapping message 116 indicating the multicast tree FEC (for example an identifier "200"), the root R4 of the multicast tree and the label it pushes to R3, label L2. In the case of a P2MP network the downstream direction for traffic is from R4 via R3 to R2 and hence the label mapping message is sent upstream from R2 to R3.

At step 206 node R3 similarly allocates a label L5 and updates its forwarding state such that incoming packets with label L5 will have the label swapped for label L2 and forwarded along interface S1 to R2. Node R3 further sends a P2MP label mapping message to node R4 indicating the FEC 200, the root R4 and its label L5 at step 208. At step 210 root node R4 updates its forwarding state with label L5 for the FEC 200. It will be n o t e d that steps 200 to 210 are repeated for each leaf or receiver node joining the multicast tree. For example if node R1 joins the tree then it sends a P2MP label mapping message to R3 with FEC 200, route R4 and label L1. In this case, as is appropriate for multicast, R3 does not construct a further label to send to R4 but adds label L1 to the forwarding state corresponding to incoming packets with label L5.

P2MP LDP Multicast can be further understood with reference to FIG. 3 which shows the network of FIG. 1 with the datapath of multicast traffic, and FIG. 4 which comprises a flow diagram showing the steps performed in the forwarding operation. At step 400 the root node R4, acting as ingress node to the P2MP network, recognizes in any appropriate manner traffic for example ingress IP traffic for the multicast tree 100 and forwards the traffic shown as packet 300 to which the label L5 302 is appended to an IP payload 304. The forwarding table or multicast LFIB (mLFIB) 306 maintained at R3 for traffic incoming on interface S2 is shown in FIG. 3 for "down" traffic, that is, traffic from the root to the receivers. At step 402 node R3 carries out an RPF check to ensure that the incoming packet with label L5 arrived on the correct interface S2. If so, then at step 404 labels L1 and L2 are swapped for label L5 for forwarding along respective interfaces S0 and S1, as shown at step 404. As a result packets 308, 310 are sent to the respective receivers with the appropriate label appended to the payload.

Provision is also made for withdrawal of labels. For example referring to FIG. 5, which is a flow diagram illustrating the steps performed in a label withdrawal transaction, where a node for example node R2 wishes to leave the multicast tree then at step 500 it sends a label withdraw message to its nexthop neighbor R3. At step 502, node R3 deletes the relevant state for example label L2 and at step 504 R3 sends a label release message to R2. It will be noted that if node R1 also leaves the tree then node R3 will remove all of the state corresponding to FEC 200 and will send a label withdraw message to node R4.

FIG. 6 is a flow diagram illustrating the steps performed when a nexthop changes but without removal of any receiver node from the multicast tree. An example topology is shown in FIG. 7, which is a network diagram corresponding to FIGS. 1 and 3 but with an additional node R5 700 as node R3's nexthop to node R4, and an additional node R6 702 as an alternative nexthop for node R2 to node R4. Node R2's nexthop to node R4 will change if the link between node R5 and node R4 fails, and change to, for example, node R6.

In that case at step 600 node R2 sends a label withdraw message to node R3 and at step 602 node R2 clears the relevant entries in its mLFIB. At step 604 node R2 sends its new label for example L6 to node R6 following the label mapping procedures described above with reference to FIG. 2. At step 606 node R6 installs the label L6 and forwards a label mapping message to root R4 again in the manner described above.

It will be noted that LDP allocates a local label for every FEC it learns, and if the FEC is removed, the local label and an associated binding (i.e. remote corresponding labels) for the FEC are preserved for a timeout period. If the FEC is reinstated before the timeout expires, LDP uses the same local label binding for that FEC. Accordingly where there is a network change which changes the route of the multicast tree's unicast nexthop, the same local label binding is used and rewritten in an ingress interface independent manner such that the label rewrite is used on the data plane, i.e. in the mLFIB, before and after the network change.

In the event of a network change such as removal or introduction of a network component such as a node (router) or link between routers, an MPLS multicast fast reroute technique has been proposed in U.S. patent application Ser. No. 11/336,457 entitled "Method and Apparatus for Implementing Protection for Multicast Services" of Raj et al dated Jan. 20$^{th}$ 2006 the contents of which are incorporated by reference as if fully disclosed herein. According to Raj et al each router in a network has a primary path to a destination and, in addition, identifies backup paths around failed components and pre-installs them. For example in the case of a potential link failure, a repairing router identifies a backup path to its nexthop node across the link. In the case of a node failure the repairing router identifies a backup path to the next nexthop node which would have been forwarded to by the nexthop node. The backup paths comprise label switched paths and an appropriate signaling mechanism is implemented to distribute the corresponding labels, the backup paths hence acting as traffic tunnels in repair mode.

The approach in Raj et al can be further understood from FIG. 8 which is a network diagram illustrating a P2MP network including a link failure and FIG. 9 which is a network diagram illustrating a P2MP including a node failure. Referring firstly to FIG. 8 it will be seen that if interface S2 fails between nodes R4 and R3 (reference numerals 108, 106) then node R4 as repairing node can institute a repair tunnel 800 around the failed node (for example using additional nodes and links which are not shown) to node R3. Referring to FIG. 9 where node R3 itself fails then node R4 can implement repair tunnels 900, 902 to nodes R2, R1 respectively as next nexthop nodes.

However, a problem inherent in both unicast and multicast traffic is that of micro looping. In essence, micro loops occur when a network change takes place and nodes converge on the new network at different times. Whilst the nodes are not all converged, there is a risk that one node will forward according to an old topology whereas another node will forward according to a new topology such that traffic will be sent back and forth between two or more nodes in a micro loop. In IP networks, transient micro loops can occur for example because of control plane inconsistency between local and remote devices (that is, for example, inconsistencies in the RIB), control and data plane inconsistency on a local device (that is inconsistencies between the RIB and the FIB if the FIB has not yet been updated) and inconsistencies on the data plane between local and remote devices, for example where the FIB or LFIB or respective nodes are converged on different topologies.

Transient micro loops are in fact common in IP networks and in unicast IP routing the impact and number of devices affected is restricted. However in the case of multicast networks there is the risk of exponential-traffic loops during convergence. For example if there are 100,000 multicast trees through a multicast core router such as router R3 then during a network change, transient micro loops could bring down the entire network.

It will be seen that a similar transient micro loop problem can occur in the case of networks supporting multicast fast reroute as described in Raj et al. However micro loops are not acceptable during fast reroute in view of the risk of data loss. For example the problem can occur during fast reroute when a link-down event occurs, that is to say a link fails. In that case the local node, for example node R4 detects the failure and enables the backup path. The routing protocol then propagates the link failure to the remote nodes. However, each node may receive the failure notification at a different time, depending upon its location. Also each node may take a different amount of time to compute and install the path independently. Therefore there may be a period of time in which some of the nodes may have a new path installed and others may have the old path installed meaning that the link-down event can lead to the formation of transient micro loops despite the presence of fast reroute. Similar problems can arise when a new link is introduced in the network.

A further problem can arise when back up paths are invoked by multiple nodes. This may occur, for example, upon node failure being detected by multiple repairing nodes across respective links. According to unicast routing, multiple upstream nodes (where upstream is in the direction from the receivers to the root) can use the same downstream node as a nexthop. In this case according to multicast fast reroute approaches, each upstream node will compute the backup path for a node failure which will appear as multiple link failures. In that case, a first upstream node may attempt to repair using a backup path that includes another of the upstream repairing nodes. If this node is also repairing via a backup path using the first upstream node then there will be a loop between the backup paths. This can be termed a fast re-route loop.

Fast reroute loops can be understood further with reference to FIGS. 10 to 13 which are network diagrams illustrating a P2MP network in relation to which such a loop may be instigated. Referring to FIG. 10 a P2MP network includes a root node 1000 and receiver nodes 1012, 1014 both of which are downstream of a transit node 1010. The root node 1000 has two paths to the transit node 1010 either via nodes 1002, 1006 or via nodes 1004, 1008. Referring to FIG. 11, in the event of failure of the link 1016 between nodes 1006 and 1010, node 1006 as a repairing node or point of local repair may institute a link protection repair path 1018 via node 1002, 1000, 1004, 1008 to the transit node 1010 from which data is then forwarded normally. Conversely, as shown in FIG. 12, if the failure is in fact at node 1010 then both nodes 1008, 1006 ,will detect the failure as failure of respective links 1016 and 1022 and institute respective link protection label switched paths 1018, 1020 in opposite directions via nodes 1004, 1000, 1002 and 1006. It will be seen that if both nodes 1006 and 1008 use their link protecting backup paths at the same time it would create a fast reroute loop whereby node 1006 attempts to repair node 1008's repaired traffic back to node 1008 and so forth. This loop can be seen further in FIG. 13 as loop 1024.

SUMMARY OF THE INVENTION

The needs identified in the foregoing Background, and other needs and objects that will become apparent for the following description, are achieved in the present invention, which comprises, in one aspect a computer apparatus comprising a processor and a forwarding engine arranged to forward LDP multicast traffic along a multicast tree having a primary and a backup path in a converged network topology. The processor is configured to cause the forwarding engine to forward traffic via the backup path upon a topology change and send a changed topology label and path vector to at least one neighbor node in the changed topology.

The needs identified in the foregoing Background, and other needs and objects that will become apparent for the following description, are achieved in the present invention, which comprises, in one aspect, a method of forwarding data in a data communications network having a plurality of nodes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF AN
ILLUSTRATIVE EMBODIMENT

A method and apparatus for forwarding label distribution protocol multicast traffic is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1. Structural and Functional Overview
2. Method and Apparatus for Forwarding Label Distribution Protocol Multicast Traffic
3. Implementation Mechanisms-Hardware Overview
4. Extensions and Alternatives 1. Structural and Functional Overview In overview the approach described herein prevents transient micro loops in fast reroute without traffic loss by application of various mechanisms. First of all ordered installation of the mFIB/rmLFIB is invoked in the upstream direction and preferably also in the downstream direction. As a result each node installs its new path in sequence such that loops are avoided. Furthermore new labels are allocated for each ingress change ensuring that traffic either remains on the old path or is forwarded along a new path and cannot loop between the two; both the old and new independent multicast LSP trees are used for forwarding for a timeout period after the failure.

As a result traffic is forwarded only when all of the upstream and downstream nodes are converged; the convergence being verified using for example unicast route convergence verification procedures or multicast route convergence verification procedures.

Figure 14:
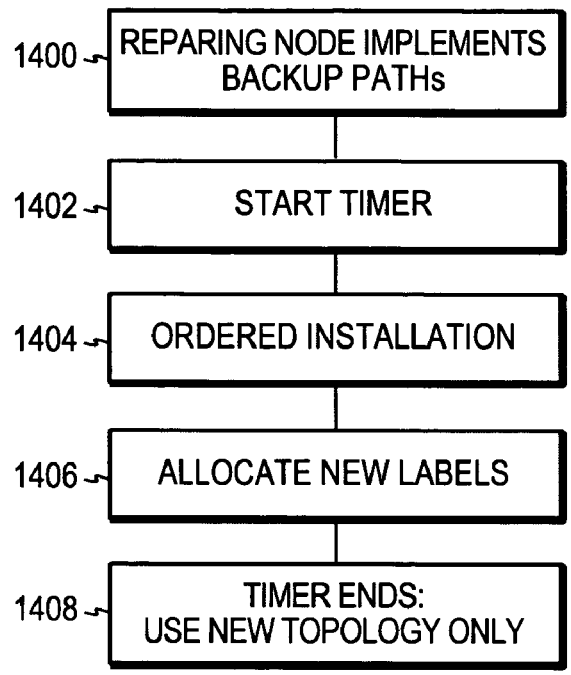
FIG. 14 is a flow diagram illustrating at a high level steps involved in avoiding transient micro loops.

This can be understood further with reference to FIG. 14 which is a flow diagram illustrating at a high level steps involved in preventing micro loops in multicast fast reroute. When, for example, a link-down event takes place a repairing node or point of local repair (PLR) detects the failure using any appropriate mechanism and, at step 1400, enables the nexthop or next nexthop backup path tunnels. As a result all traffic is then redirected via the tunnels to the corresponding nexthop or next nexthop downstream nodes. At step 1402 the repairing node starts a stale timer in the control plane. The timer allows use of the backup paths until the full multicast tree converges and the new path is installed. At step 1404 ordered mFIB/mLFIB installation in both the upstream and downstream direction is implemented.

Figure 8:
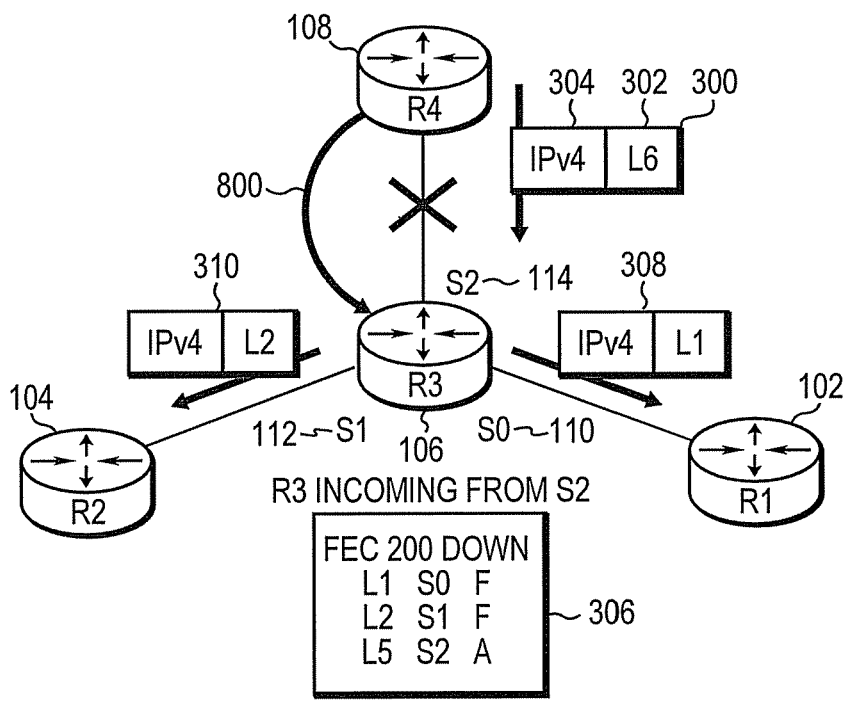
FIG. 8 is a schematic diagram network illustrating fast reroute link repair.
Figure 9:
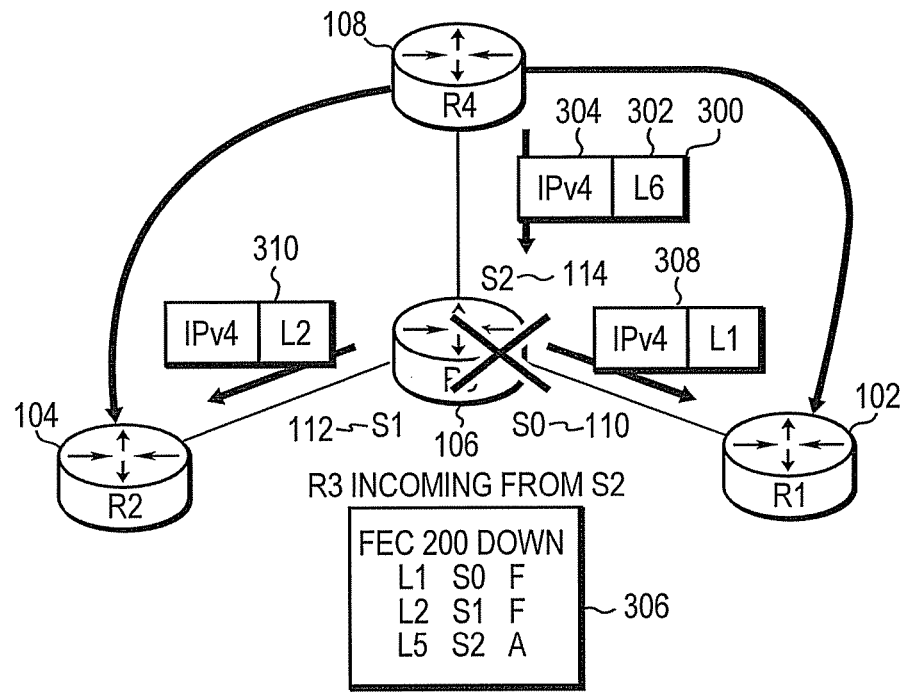
FIG. 9 is a schematic diagram of a network showing fast reroute node repair.
Figure 15:
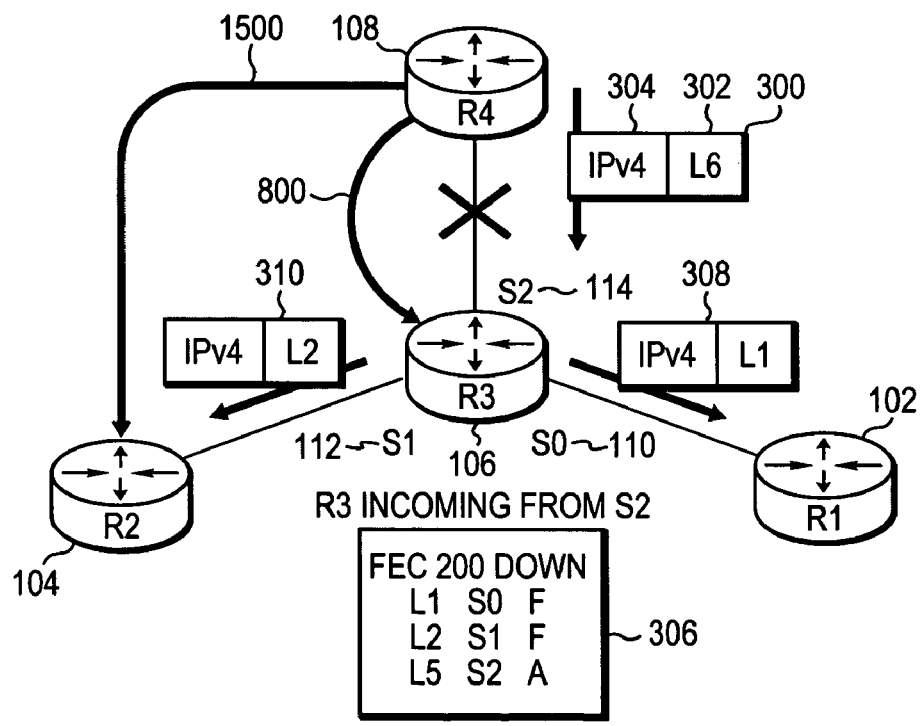
FIG. 15 is a network diagram corresponding to FIG. 8 illustrating creation of a transient micro-loop.

Referring to FIG. 15 which is a network diagram corresponding to FIG. 8 but with a converged path in the new topology shown, the importance of the step can be further understood. In particular it will be seen that after convergence the root node 108 has a new egress node R2 (104) via link 1500. Node R2 correspondingly has exchanged its previous ingress node 106 (R3) for 108 (R4) and now forwards to node R3 via link 112. Similarly therefore, node R3 has a new ingress node R2 and can forward to node R1 (102) via link 110. It will be seen that if installation is not ordered then there is a possibility, for example, that node R2 will forward multicast traffic to node R3 according to the new topology and node R3 will loop it back to R2 according to the old topology. It will be seen that where multiple nodes are affected by the topology change then the ordering of installation needs to be handled on a per-node basis as described in more detail below.

It will further be seen that the approach also works for the fast reroute case shown in FIGS. 8 and 15. For example if node R4 continues to forward packets along the repair path 800 then node R3 may forward those packets following normal multicast forwarding to node R2. If, however, node R2 is forwarding according to the new topology then it will loop those packets back to node R3. Ordered convergence also overcomes this problem.

At step 1406, new labels are allocated at each node for every ingress change. Again it will be seen that this ensures that old and new disjoint trees are provided preventing traffic loss during the link-down event. In particular referring to the scenarios set out above with regard to FIG. 15, it will be seen that if node R3 is forwarding according to the old topology on the old tree and node R2 begins forwarding according to the new topology on the new tree then traffic will not loop between the two trees, whereas if the label were reused there is a risk that node R2 would simply return traffic from node R3 if they are using respective new and old topologies.

At step 1408, at expiration of the stale timer the new multicast tree shown in FIG. 15 is used and the backup path is torn down. It will be seen that stale timer is set for a period longer than the maximum time for convergence, for example with an error factor of say 20% although any appropriate factor may be adopted. Of course the backup path may be torn down prior to this if full convergence has taken place. Such convergence may be indicated, for example, by signaling from each node in the network.

The combination of ordered convergence and label allocation mechanisms provide particularly improved transient micro loop protection even where fast re-route is implemented.

In a further improvement, fast reroute loops are prevented. In a first instance this is achieved by identifying—upon pre-computation of backup paths, whether there is a potential for a unicast fast reroute loop. In that case, node failure detection is enabled and the backup path is only implemented in the case of link failure as a result of which repaired packets will not be looped back from another neighbor of a repaired node.

In a further approach, fast reroute loops are avoided by ensuring that parallel paths are avoided in mLDP such that loops cannot occur, as described in more detail below.

Figure 16:
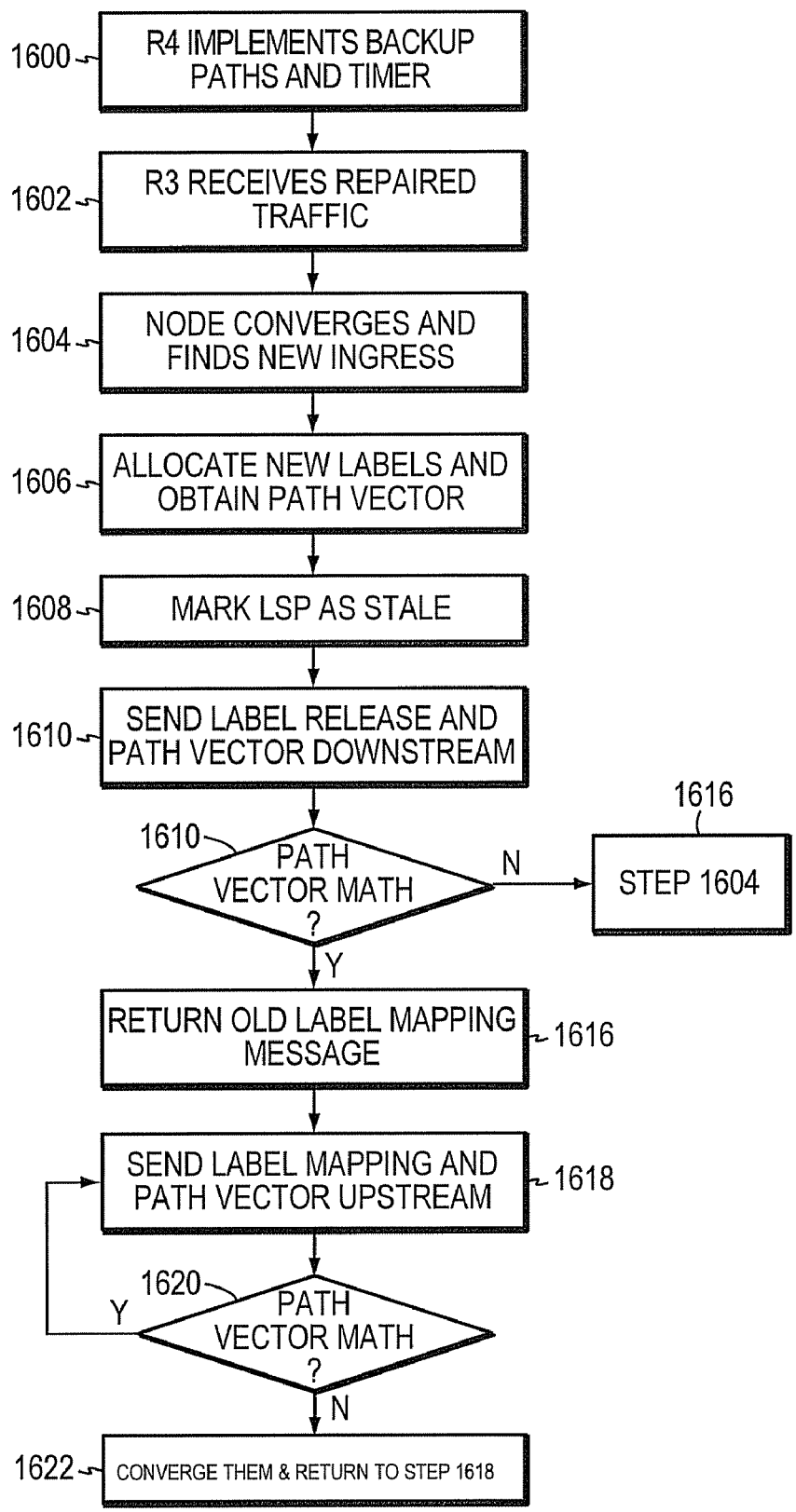
FIG. 16 is a flow diagram showing in more detail steps involved in avoiding transient micro-loops in multicast fast reroute.

2. A Method and Apparatus for Forwarding Label Distribution Protocol Multicast Traffic The approach described herein can be understood in further detail with reference to FIG. 16 which is a flow diagram illustrating in more detail steps followed for avoiding loops in multicast path reroute. At step 1600 the failure is detected at the point of local repair which switches from its primary rewrite to its backup rewrite using the nexthop/next nexthop tunnel list and starts the stale timer. For example referring once again to FIG. 15 the point of local repair is node R4 (108) which instigates a repair tunnel to node R3 (106) via a tunnel 800 using additional routers (not shown). At step 1602 node R3 receives the traffic from tunnel 800 and recognizes it for example based on predistribution of tunnel labels as discussed in Raj et al. Node R3 then forwards the traffic via normal multicast routing to nodes R1 and R2. At step 1604 unicast routing converges at node R3, that is to say, it updates its FIB with its newly calculated nexthops for the new topology and finds its new ingress node, node R2. A new, distinguishable local label is allocated for the FEC corresponding to the new multicast tree, for example a label L23 for FEC 200. At step 1606, node R3 obtains the new routed unicast path vector from the unicast convergence. The path vector indicates the new route to the root node R4, namely R3-R2-R4. At step 1608 the existing LSP (P2MP LSP rewrite) is marked as stale, however node R3 continues to use it. As a result the old and new P2MP LSP's are rendered disjoint.

At step 1610 ordered downstream node convergence is initiated. In particular initiating node R3 sends a label release message to all P2MP downstream nodes with its new routed path vector. In the present case the downstream node is node R1. At step 1612 the downstream node checks whether the path vector indicates that its ingress has changed. Alternatively it can determine this from an RPF check.

If the ingress node has not changed then at step 1614 the downstream node R1 sends the old label mapping message with the old label back to node RS as the same tree can be used for it and each point downstream and there is no need to check for further convergence downstream. Hence, at step 1618, node R3 is able to join the new binding from the downstream node with a new local label and create its new rewrite, as all downstream nodes are converged. However traffic is still sent using the stale/old LSP tree.

If, however, the ingress node has changed then at step 1616 the node will revert to step 1604. For example node R2 has a new ingress node R4 and so would also be carrying out the steps shown in FIG. 16 as an initiating node. Its downstream node in the new topology is node R3 which also has a new ingress node such that the process would have to stop while node R3 converged. Hence it can be seen that the approach ensures ordered downstream convergence and allocation of new labels for new topologies.

Reverting to step 1618, when downstream convergence has taken place then upstream node convergence is instigated. Once the initiating node, for example node R3 has received its label mapping message from the downstream node, indicating that full downstream convergence has taken place, it sends a label mapping upstream with its path vector. At step 1620 the next upstream node (in this case node R2) checks for convergence by comparing against its own path vector.

If, at step 1620, there is a path vector match then this indicates that the upstream node is converged and the process returns to step 1618 where it sends its label mapping and path vector upstream once again. If, however, there is no match then at step 1622 the process stops until the node has converged and then returns to step 1618 from which it sends its label mapping and path vector upstream. As a result upstream ordered convergence is also obtained.

It will be noted that throughout the process the old tree with its corresponding labels is maintained such that both the old and new labels can be used in conjunction. For example the new tree can be instituted after a first expiration of the stale timer corresponding to a convergence period. No looping will take place between the trees because they are disjoint. The old tree and repair tunnels can be torn down for example after a second timeout period which may be equal to or greater than the first timeout period. It will be noted that convergence can be verified using the unicast path vector in conjunction with for example unicast LDP signaling or multicast LDP signaling to confirm upstream node convergence such that the new tree can be instigated as soon as convergence is detected.

It will be recognized that various topology change scenarios are contemplated and the approaches described herein can deal with any of the scenarios. In one scenario, for example, only an ingress node changes but not an egress node. For example as discussed above in the case of node R3, node R3 sends its label release message and a new routed path vector to each downstream node which converge in order after which node R3 sends its label mapping and path vector upstream and nodes also converge upstream in an ordered manner. Again as discussed above two traffic-disjoint LSP's exist at the same time making it possible to obtain zero or near zero traffic loss as, even if a neighbor is using the old label, there will not be looping between the old and new trees. It will be noted that allocation of the new label can take place only if the nexthop is changed reducing usage of the label space and requirement for LDP messages.

In the second scenario both ingress and egress nodes can be changed for example as in the case of node R2 in the example above. In that case, as can be seen, the approach ensures that, at each downstream node affected by the change, the process of ordered convergence is repeated.

In a third scenario the ingress node may be unchanged but some egress nodes are changed. For example in the case of root node R4, if there were a further upstream router in the multicast tree whose path was unaffected then this scenario would apply and once again the process above can be implemented in particular to establish downstream ordered convergence as upstream convergence will be quickly established.

Figure 10:
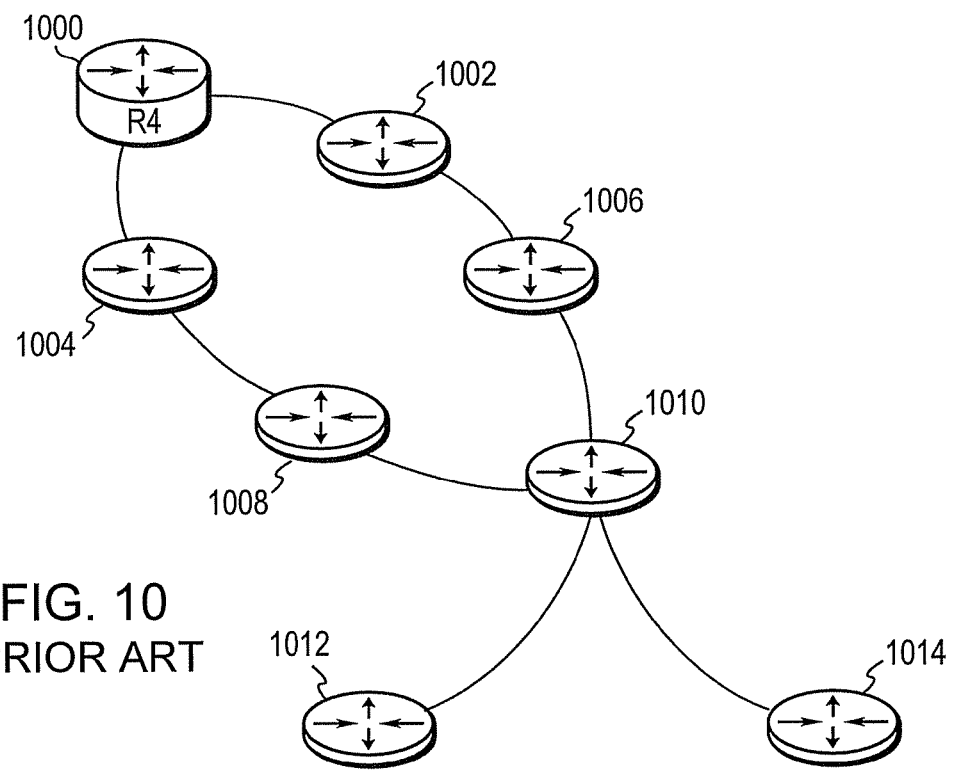
FIG. 10 is a schematic diagram showing parallel multicast paths.
Figure 11:
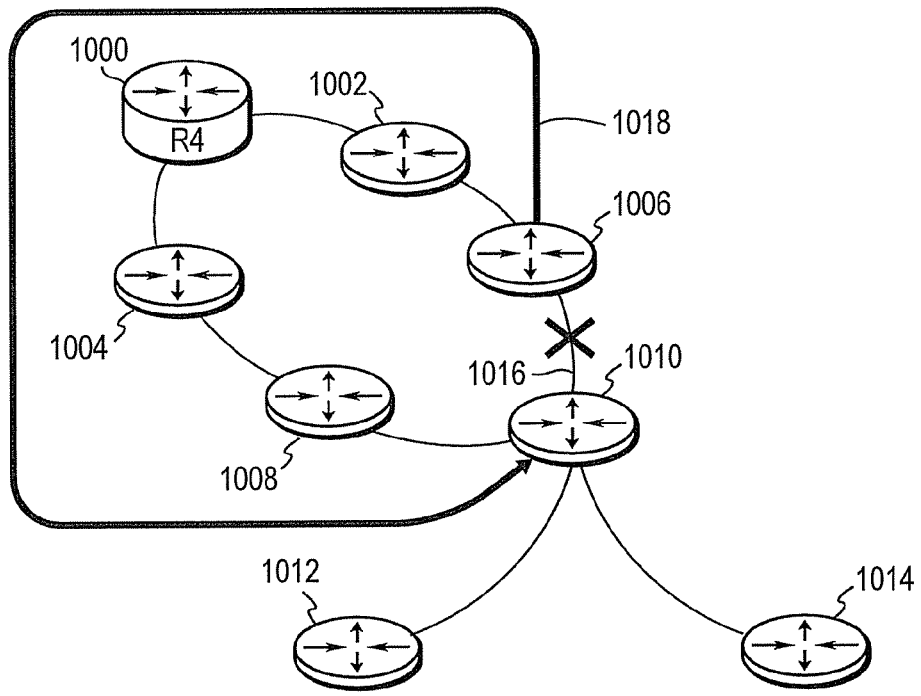
FIG. 11 is a diagram of the network corresponding to FIG. 10 in which link protection is instigated by a first node.
Figure 12:
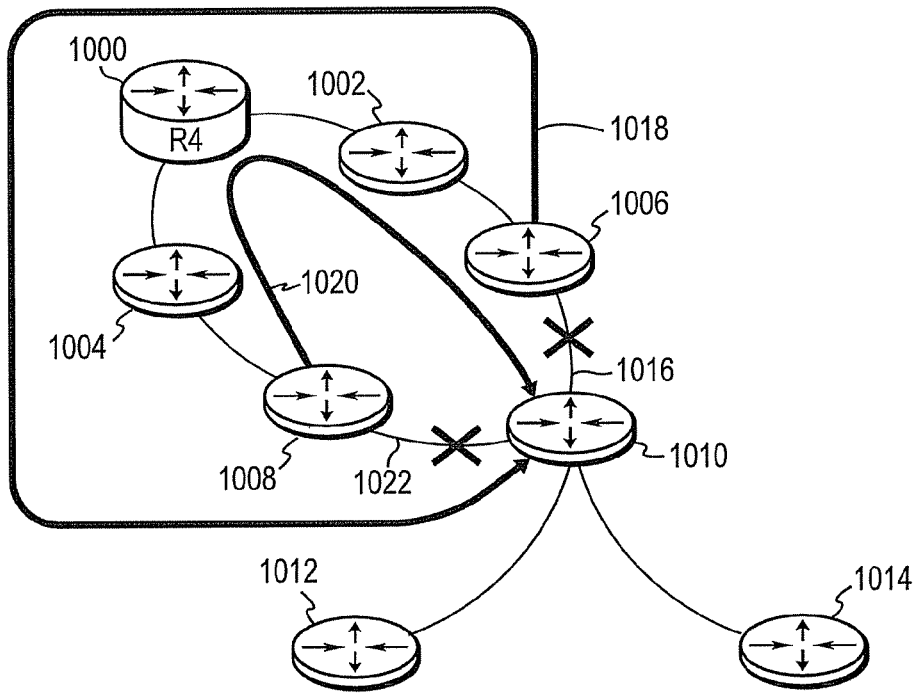
FIG. 12 is a schematic diagram of a network corresponding to FIG. 10 in which link protection is instigated by a second node.
Figure 13:
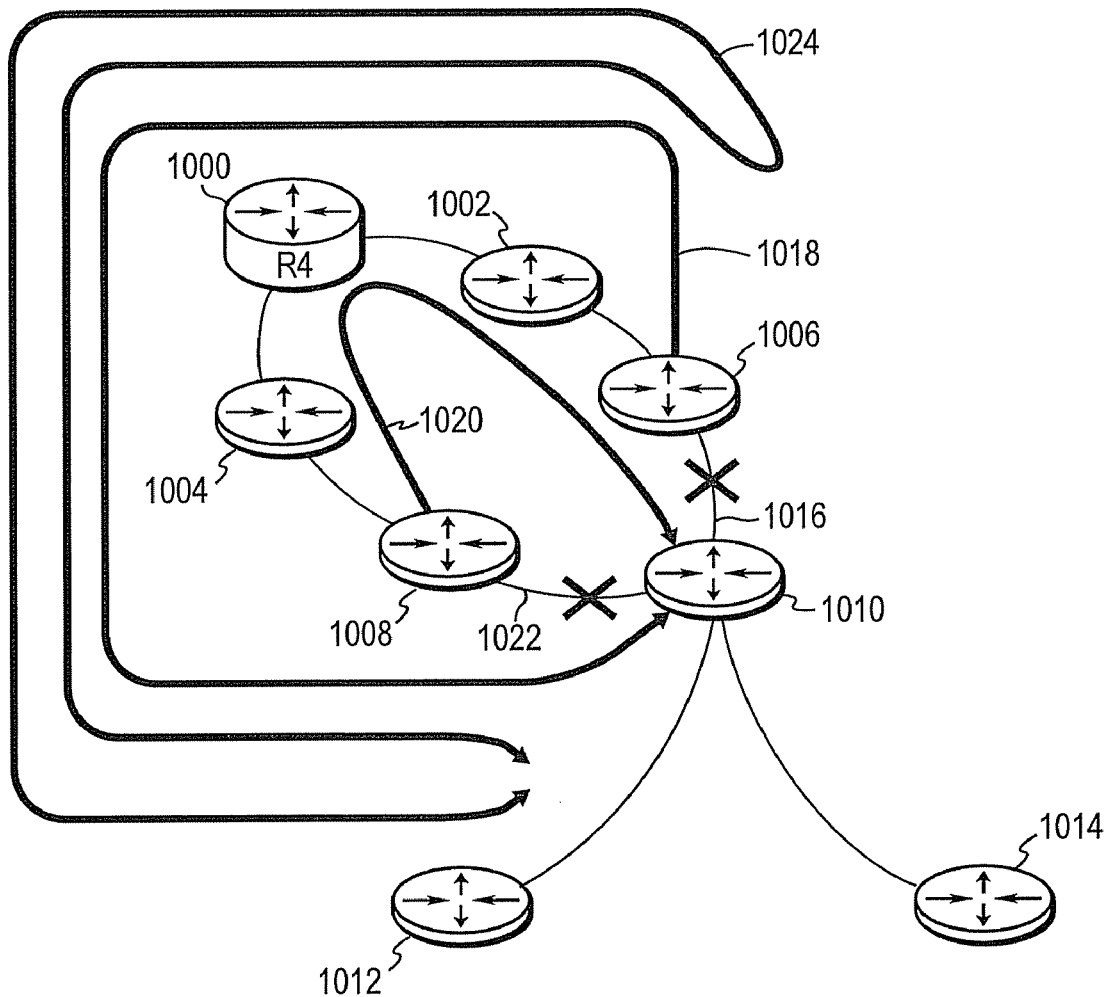
FIG. 13 is a schematic network diagram corresponding to FIG. 10 illustrating a fast reroute loop.
Figure 17:
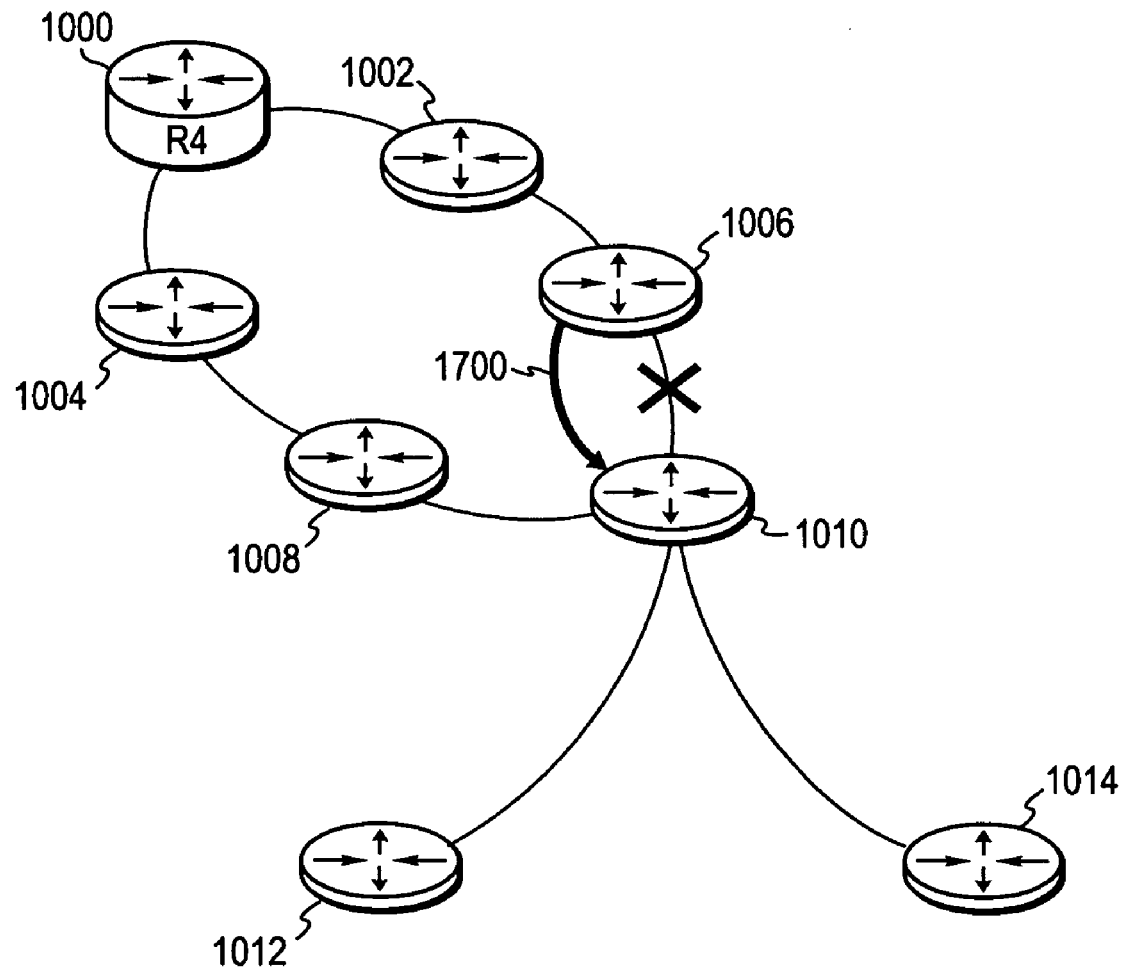
FIG. 17 is a schematic network diagram showing avoidance of fast reroute loops according to a first configuration.

In all of these cases it can be seen that the use of disjoint trees ensures that loops between the new and old LSP's and associated traffic loss are not encountered in the case of fast reroute as can be understood from FIG. 17 which is a network diagram generally corresponding to FIG. 10 but with a fast reroute path around a failure shown. In particular where a link between routers 1006 and 1010 fails then a backup path 1700 is instigated. Traffic according to the old LSP will progress from the root node 1000 via node 1002, node 1006, backup path 1700 and node 1010 to receivers 1012 and 1014 according to the old LSP. Following convergence, traffic from root node 1000 will proceed via nodes 1004, 1008 to node 1010 and then to receivers 1012 and 1014 according to the new is LSP. Because the LSP's are disjoint there is no risk of looping between the trees.

Figure 18:
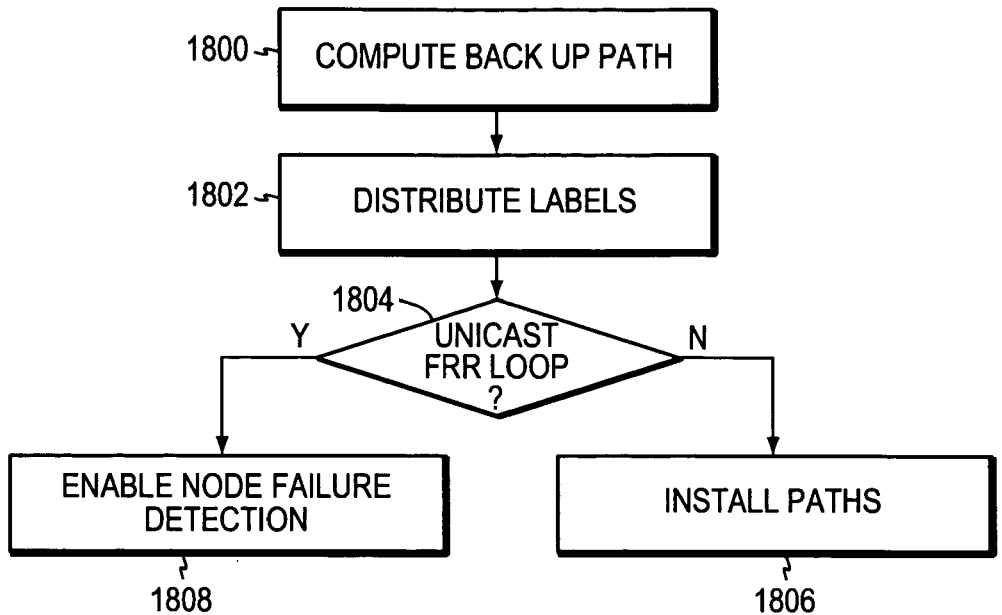
FIG. 18 is a flow diagram illustrating fast reroute loop avoidance.

According to a further aspect the approach described herein ensures that there is no looping between conflicting fast reroute paths. Referring to FIG. 18, which is a flow diagram illustrating fast reroute loop avoidance, at step 1800 the repairing node computes a back up path and at step 1802 it distributes the backup path for example by swapping appropriate labels with its nexthop or next nexthop.

At step 1804 the repairing node identifies whether there is a unicast fast reroute loop risk. This can be done in any appropriate manner for example by applying the unicast mechanism described in U.S. patent application Ser. No. 11/203,801 entitled "Method and Apparatus for using Multi-protocol Label Switching (MPLS) Label Distribution Protocol (LDP) to Establish Label Switching Paths (LSPS) for Directed Forwarding" of Raj et al dated Aug. 15, 2005 and incorporated by reference herein as if fully disclosed. If no loop potential is identified, then at step 1806 the fast reroute paths are fully installed. If, however, fast reroute loop potential is identified then, at step 1808, node failure detection is enabled.

Figure 19:
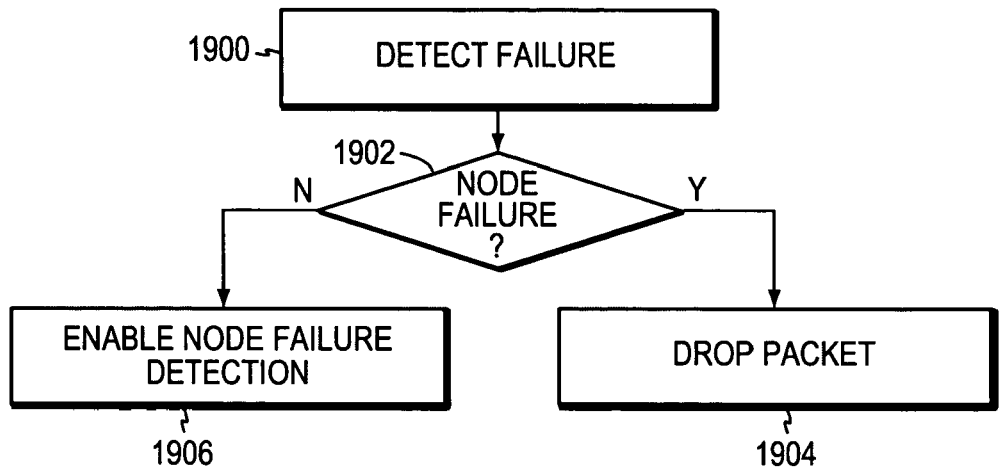
FIG. 19 is a flow diagram illustrating the steps subsequently performed at a repairing node upon detection of a failure

FIG. 19 is a flow diagram illustrating the steps subsequently performed at a repairing node upon detection of a failure. At step 1900 failure is detected. At step 1902 the repairing node assesses whether the failure is a node failure using any appropriate mechanism, for example signaling to other neighbors of the node. If it is node failure then at step 1904 the packet is dropped as it cannot be repaired otherwise, at step 1906, link repair is implemented. As a result it can be seen that fast reroute loops can be avoided.

The position can be strengthened further to ensure that fast reroute loops do not occur. In particular this is achieved by avoiding parallel branches in mLDP LSP multicast trees to prevent those loops. It will be noted that in LDP multicast, receiver initiated multicast trees are built towards the source router according to the unicast RIB, the source router being considered as the root of the tree. In unicast operation, where a node identifies two equivalent paths to the same destination, for example because they share an equal cost in the case of an equal cost multiple path (ECMP) split, or otherwise multiple nexthops are available towards a destination, unicast may allow any of those paths to be adopted using an arbitrary selection procedure, load balancing or any other appropriate mechanism. As a result loops between multiple paths can occur in multicast.

Figure 1:
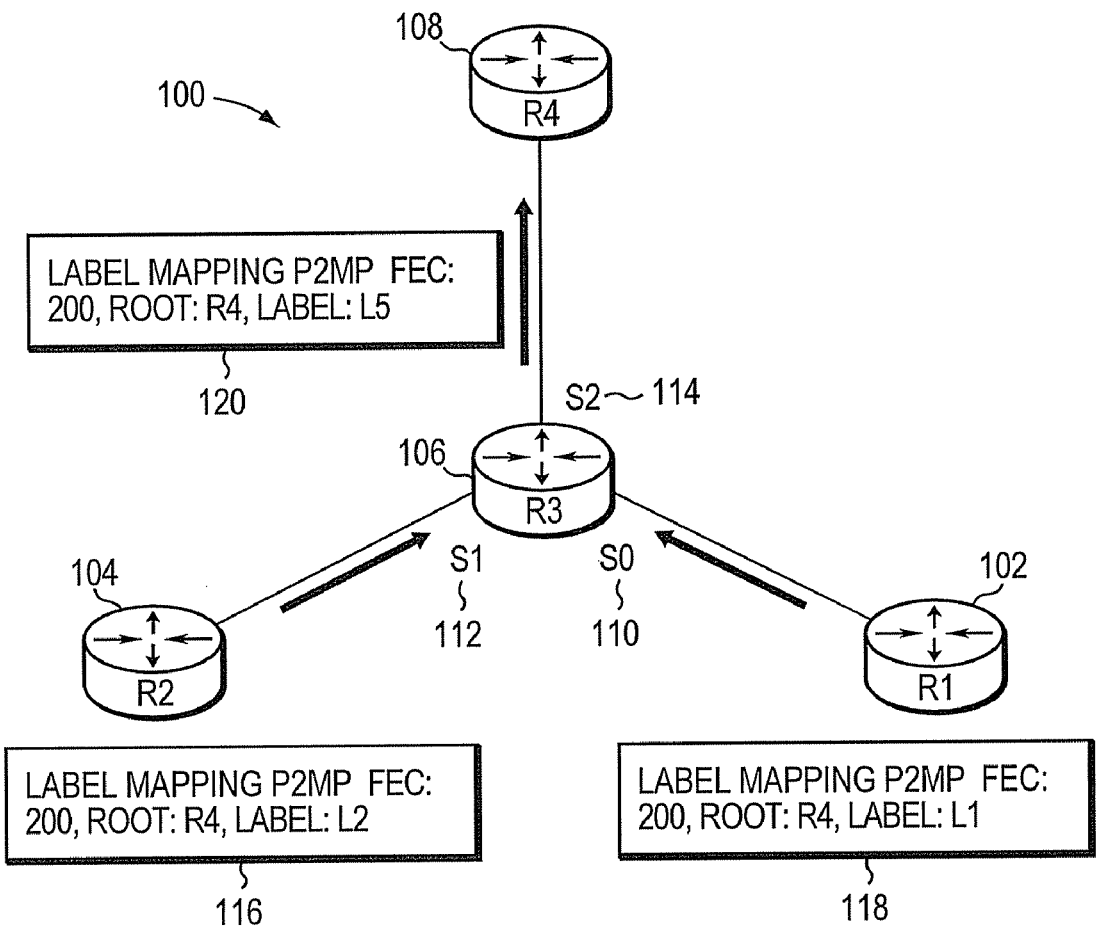
FIG. 1 is a schematic diagram illustrating a P2MP network.
Figure 2:
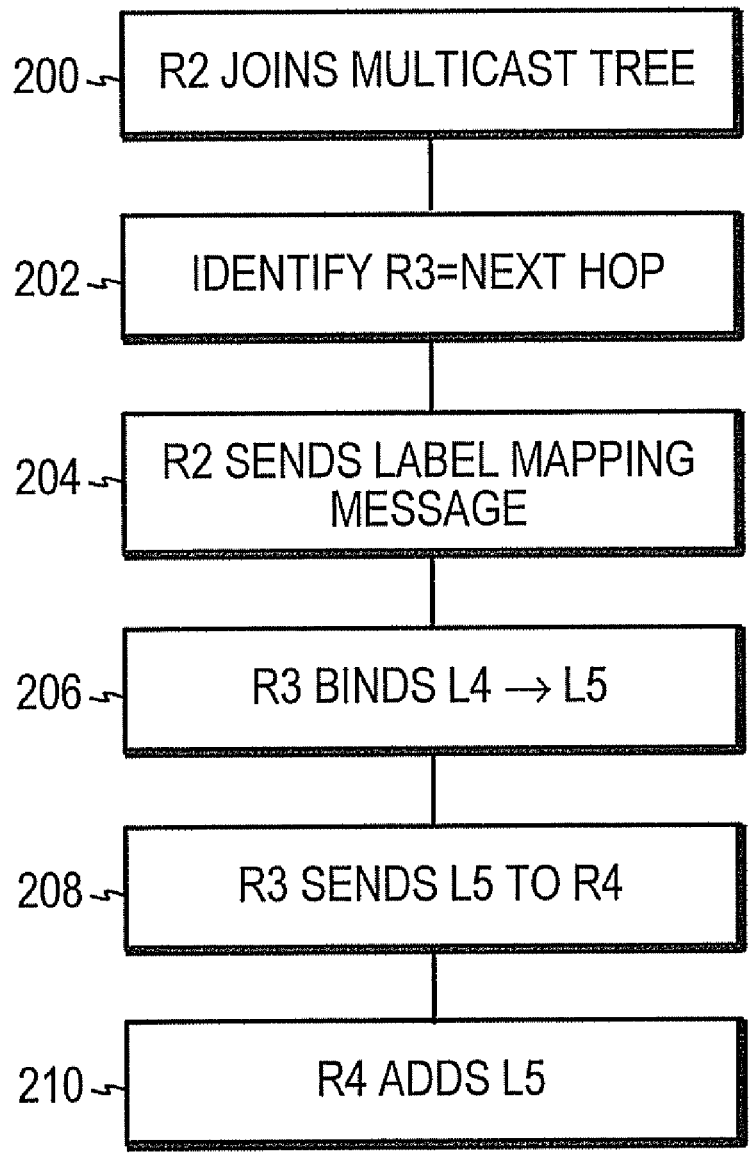
FIG. 2 is a flow diagram illustrating the steps involved addition of a leaf to a P2MP network.
Figure 3:
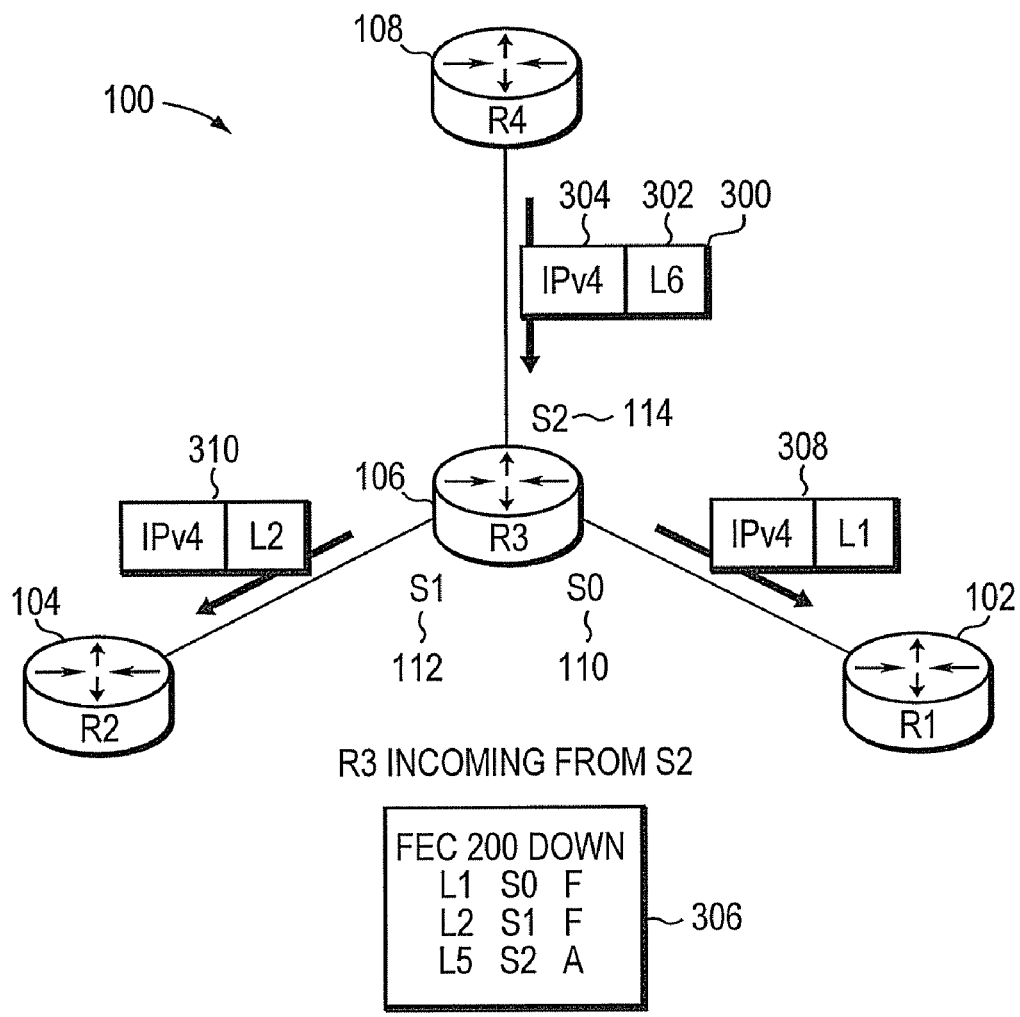
FIG. 3 is a network diagram corresponding to FIG. 1 showing the forwarding of multicast traffic on a P2MP network.
Figure 4:
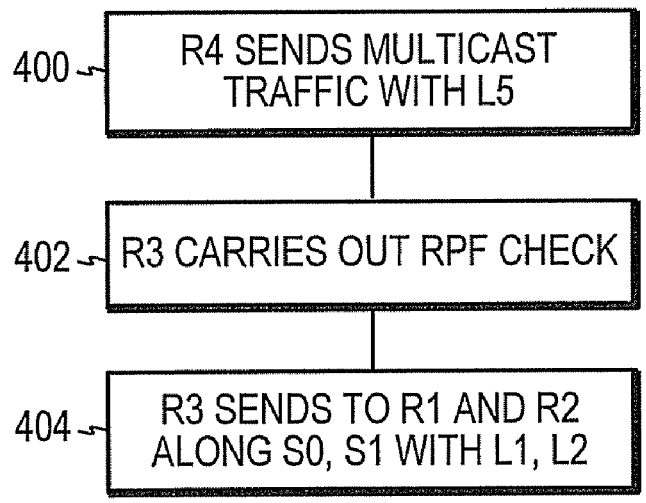
FIG. 4 is a flow diagram illustrating the steps involved in forwarding multicast data on a P2MP network.
Figure 5:
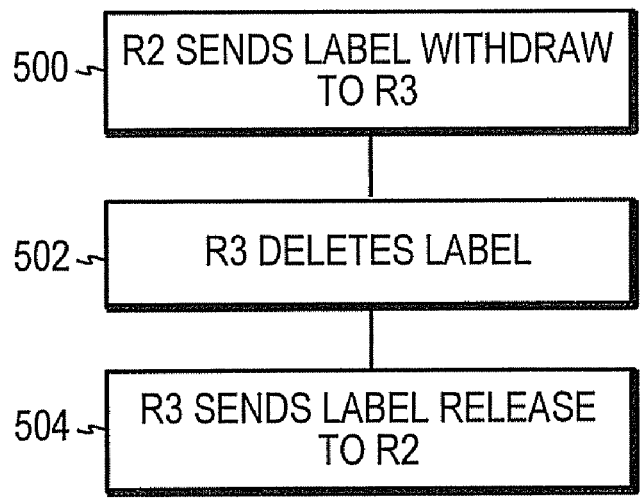
FIG. 5 is a flow diagram illustrating the steps involved in a label withdraw session when a leaf leaves a P2MP network.
Figure 6:
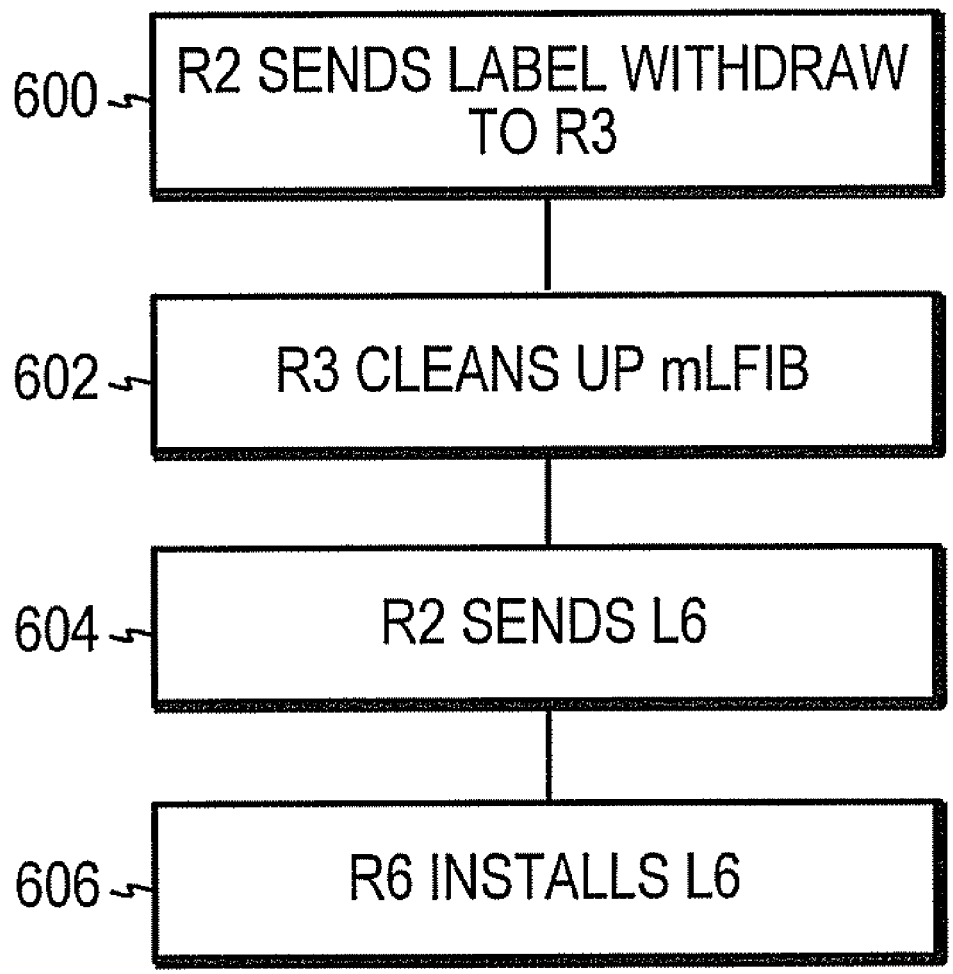
FIG. 6 is a flow diagram illustrating the steps involved in a label withdraw session when a nexthop changes in a P2MP network.
Figure 7:
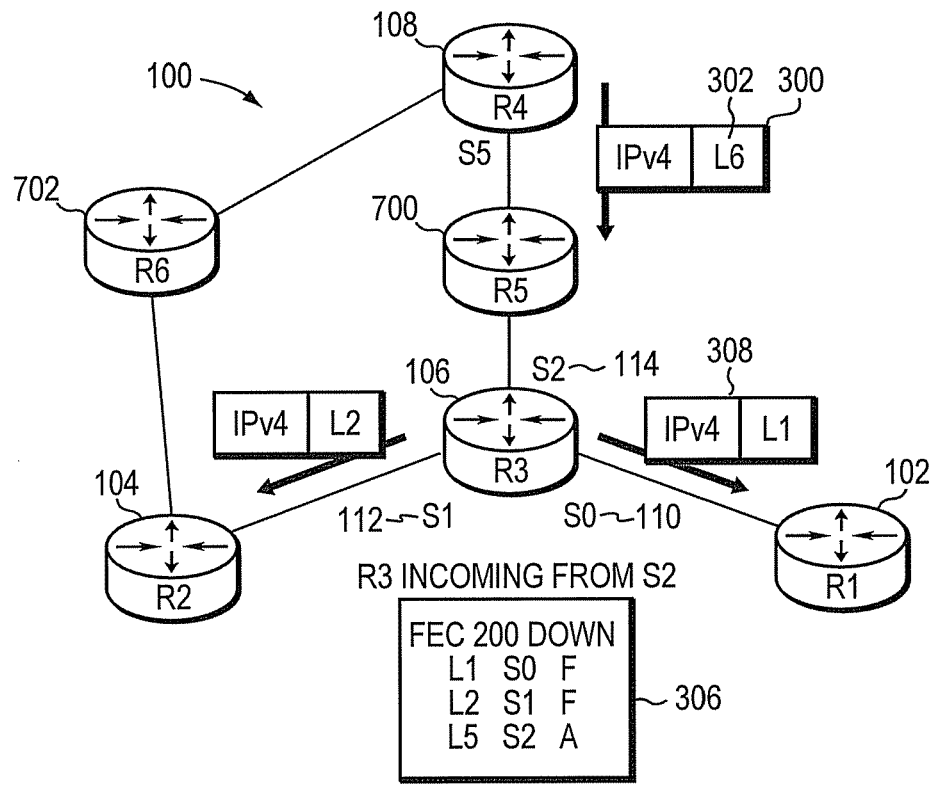
FIG. 7 is a schematic diagram of a network as shown in FIG. 3 with additional nodes to illustrate a nexthop change.
Figure 20:
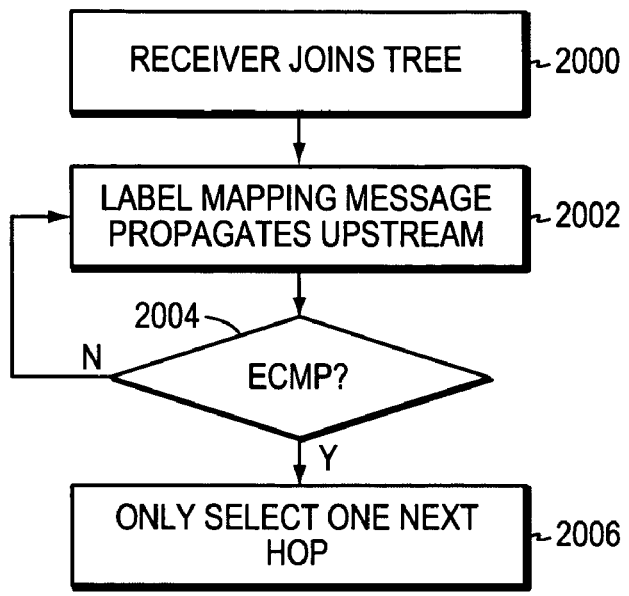
FIG. 20 is a flow diagram showing steps involved in avoiding of the fast reroute loops according to a second configuration.

The approach described herein can be understood with reference to FIG. 20 which is a flow diagram illustrating the steps involved in building an MLDP network avoiding potential fast reroute loops. At step 2000 a receiver (for example node R1 in FIG. 1) joins the multicast tree and sends a label mapping message to its next upstream router. That upstream router is selected according to unicast forwarding as the nexthop to the source or root. For example in FIG. 1 the nexthop is node R3 towards the root R4.

Figure 21:
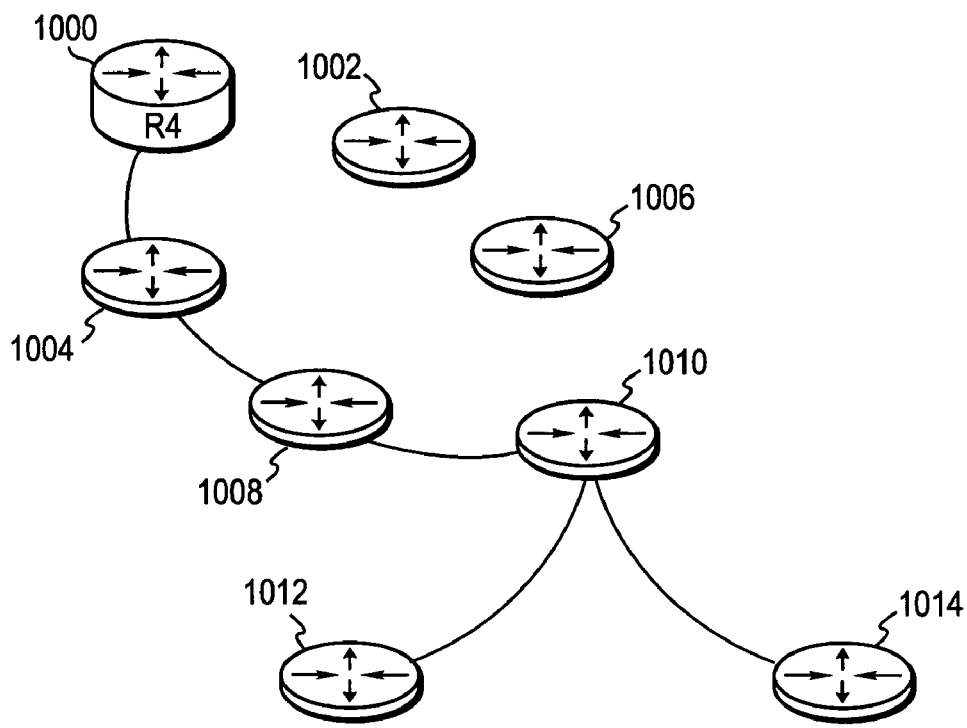
FIG. 21 is a schematic network diagram showing avoidance of fast reroute loops according to the second configuration.

In step 2002 the label mapping message is propagated upstream unless, at step 2004 an ECMP or other multiple hop upstream path is identified. In that case mLDP only selects one nexthop at step 2006 and builds the tree accordingly. This approach can be further understood with reference to FIG. 21 which is a network diagram corresponding to FIG. 10 in which only a single multicast path from node R4 to node 1010 is selected via nodes 1004, 1008. The alternative path via nodes 1002 and 1006 is not created and it can be seen that this is achieved at node 1010 by selecting only one of the two available nexthops out of 1006 and 1008, namely node 1008. That nexthop can be identified in any appropriate manner for example arbitrarily. As a result a downstream nexthop node can never connect to more than one upstream node in the mLDP ensuring that fast reroute loops are avoided even when dynamic backup paths are used.

The manner in which the method described herein is implemented may be in software, firmware, hardware or any combination thereof and with any appropriate cochanges as will be apparent to the skilled reader without the need for detailed description here. In particular it will be appreciated that the new signaling and label distribution approach described herein can be implemented in any appropriate manner.

It will be seen that as a result of the arrangement described rapid recovery for example within the 50 millisecond range can be obtained without physical fibre redundancy, providing full protection with the existing network connectivity and reusing the unicast LDP fast reroute mechanisms for multicast fast reroute.

3. Implementation Mechanisms-Hardware Overview

Figure 22:
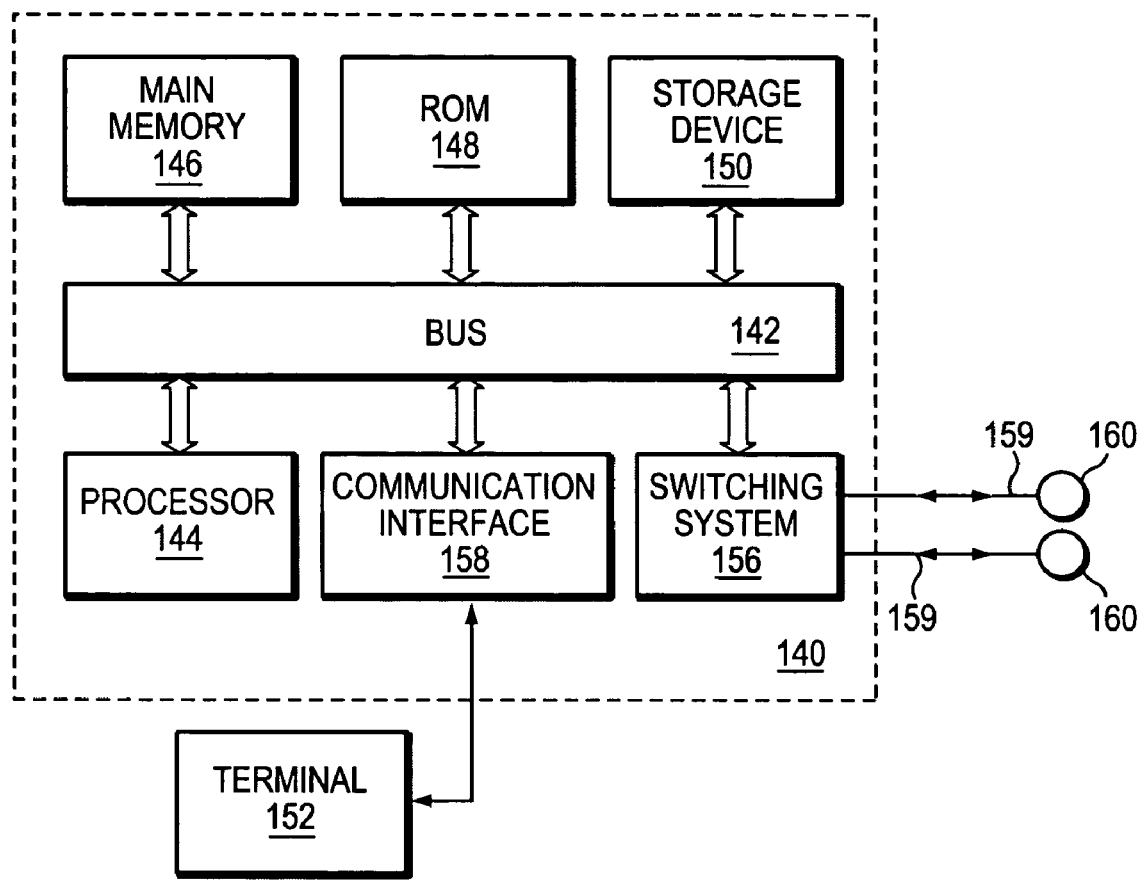
FIG. 22 is a block diagram that illustrates a computer system upon which a method for forwarding label distribution protocol multicast traffic may be implemented.

FIG. 22 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a node acting as root, leaf or transit node or router, the above described method. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multiprocessing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

4. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The method steps set out can be carried out in any appropriate order and aspects from the examples and the embodiments described juxtaposed or interchanged as appropriate the method can be applied in any network of any topology supporting multicast in relation to any component change in the network for example a link or node failure or the introduction or removal of a network component by an administrator.

What is claimed is:

1. An apparatus comprising:
   a processor; and
   a network interface communicatively coupled to the processor and configured to communicate one or more packet flows in a network,
   wherein the processor is configured to
      forward label distribution protocol multicast traffic along a multicast tree having a primary and a backup path in a converged network topology,
      utilize the backup path, in response to a topology change,
      send a changed topology label and path vector to at least one neighbor node in the changed topology to establish a new multicast tree that uses at least one new label that is not utilized in the multicast tree, where the new multicast tree is disjoint from the multicast tree,
      forward traffic, using both the new multicast tree, that uses the at least one new label, and the multicast tree, during a timeout period after the topology change, and
      forward traffic after expiration of the timeout period using only the new multicast tree, that uses the at least one new label, and is disjoint from the multicast tree.

2. The computer apparatus as claimed in claim 1, wherein the computer apparatus is a router.

3. The computer apparatus as claimed in claim 1, wherein the backup path is created to one of a nexthop or next nexthop neighbor node in the converged network topology.

4. The computer apparatus as claimed in claim 1, wherein the processor is further configured to send said changed topology label and path vector to at least one of an upstream or downstream neighbor in the new multicast tree in the changed topology.

5. The computer apparatus as claimed in claim 1, wherein said changed topology label is distinguishable from an existing label.

6. The computer apparatus as claimed in claim 1, wherein the processor is further configured to commence a timer upon institution of the backup path to establish the timeout period.

7. The computer apparatus as claimed in claim 6, wherein upon expiration of the timer that establishes the timeout period, the processor is further configured to disable the backup path.

8. A computer network comprising:
   a first computer apparatus configured to i) forward label distribution protocol multicast traffic along a multicast tree having a primary and a backup path in a converged network topology, ii) utilize the backup path in response to a topology change, and iii) send a changed topology label and path vector to at least one neighbor node in the changed topology to establish a new multicast tree that uses at least one new label that is not utilized in the multicast tree, where the new multicast tree is disjoint from the multicast tree; and
   a second computer apparatus arranged to receive said changed topology label and path vector and carry out a convergence check based on the received path vector and forward traffic using both the new multicast tree, that uses the at least one new label, and the multicast tree, during a timeout period after the topology change, and forward traffic after expiration of the timeout period, using only the new multicast tree, that uses the at least one new label, and is disjoint from the multicast tree.

9. The computer network as claimed in claim 8, wherein the second computer apparatus is arranged to await convergence if the convergence check fails and send its label and path vector to its neighbor node in the changed topology after convergence has taken place.

10. The computer network as claimed in claim 8, wherein the second computer apparatus is arranged to confirm convergence to the first computer apparatus if the convergence check succeeds.

11. The computer network as claimed in claim 8, wherein the convergence check comprises an ingress node change check.

12. A method of forwarding label distribution protocol multicast traffic in a network topology comprising the steps, performed at a node in the topology, of:
   detecting a network change;
   utilizing a backup path of a multicast tree in the network topology in response to the network change;
   sending a label and path vector to at least one neighbor node in the network topology to establish a new multicast tree that uses at least one new label that is not utilized in the multicast tree, where the new multicast tree is disjoint from the multicast tree;
   forwarding traffic, using both the new multicast tree, that uses the at least one new label, and the multicast tree, during a timeout period after the network change; and
   forwarding traffic after expiration of the timeout period using only the new multicast tree, that uses the at least one new label, and is disjoint from the multicast tree.

13. The method as claimed in claim 12, wherein the backup path extends to one of a nexthop or next nexthop neighbor node.

14. The method as claimed in claim 12, wherein the at least one neighbor node that the label and path vector are sent to is one of an upstream or downstream neighbor in the new multicast tree.

15. The method as claimed in claim 12, further comprising:
   commencing a stale timer upon forwarding traffic along the backup path;
   disabling the backup path upon expiration of the stale timer; and
   using the new multicast tree.

16. A volatile or non-volatile computer readable media storing one or more sequences of instructions for forwarding label distribution protocol multicast traffic which, when executed by one or more processors, causes the one or more processors to perform the steps of:
   detecting a network change;
   utilizing a backup path of a multicast tree in a network topology in response to the network change;
   sending a label and path vector to at least one neighbor node in the network topology to establish a new multicast tree that uses at least one new label not utilized in the multicast tree, where the new multicast tree is disjoint from the multicast tree;
   forwarding traffic, using both the new multicast tree, that uses the at least one new label, and the multicast tree, during a timeout period after the network change; and
   forwarding traffic after expiration of the timeout period using only the new multicast tree, that uses the at least one new label, and is disjoint from the multicast tree.

17. An apparatus for forwarding label distribution protocol multicast traffic comprising:
   one or more processors;
   a network interface communicatively coupled to the one or more processors and configured to communicate one or more packet flows among the one or more processors in a network; and
   a computer readable medium comprising one or more sequences of instructions which, when executed by the one or more processors, cause the one or more processors to perform the steps of: i) detecting a network change, ii) utilizing a backup path of a multicast tree in a network topology in response to the network change, iii) sending a label and path vector to at least one neighbor node in the network topology to establish a new multicast tree that uses at least one new label that is not utilized in the multicast tree, where the new multicast tree is disjoint from the multicast tree, iv) forwarding traffic, using both the new multicast tree, that uses the at least one new label, and the multicast tree, during a timeout period after the network change, and v) forwarding traffic after expiration of the timeout period using only the new multicast tree, that uses the at least one new label, and is disjoint from the multicast tree.

18. A computer apparatus comprising:
   a processor; and
   a network interface communicatively coupled to the processor and configured to communicate one or more packet flows in a network,
   wherein the processor is configured to forward label distribution protocol multicast traffic along a multicast tree having a primary and a backup path in a converged network topology utilize the backup path in response to a topology change and to send a changed topology label which is distinguishable from an existing label to at least one neighbor node in the changed topology to establish a new multicast tree that uses a different label than is utilized in the multicast tree, where the new multicast tree is disjoint from the multicast tree, forward traffic using both the new multicast tree and the multicast tree during a timeout period after the topology change, and forward traffic after expiration of the timeout period using only the new multicast tree, that uses the different label, and is disjoint from, the multicast tree.

* * * * *

UNITED STATES PATENT AND TRADEMARK OFFICE
CERTIFICATE OF CORRECTION

PATENT NO. : 8,004,960 B2
APPLICATION NO. : 11/413252
DATED : August 23, 2011
INVENTOR(S) : Alex E. Raj It is certified that error appears in the above-identified patent and that said Letters Patent is hereby corrected as shown below:

Col. 14, line 35-36: "2. The ~~computer~~ apparatus as claimed in claim 1, wherein the ~~computer~~ apparatus is a router."

Col. 14, line 37: "3. The ~~computer~~ apparatus as claimed in claim 1, wherein"

Col. 14, line 40: "4. The ~~computer~~ apparatus as claimed in claim 1, wherein"

Col. 14, line 45: "5. The ~~computer~~ apparatus as claimed in claim 1, wherein"

Col. 14, line 48: "6. The ~~computer~~ apparatus as claimed in claim 1, wherein"

Col. 14, line 51: "7. The ~~computer~~ apparatus as claimed in claim 1, wherein"

Signed and Sealed this
Eighth Day of May, 2012

David J. Kappos
*Director of the United States Patent and Trademark Office*